(12) United States Patent
Leiss

(10) Patent No.: US 9,308,480 B2
(45) Date of Patent: Apr. 12, 2016

(54) CENTRIFUGAL SEPARATOR AND METHOD OF SEPARATING LIQUIDS FROM GAS

(71) Applicant: Jenny Products, Incorporated, Somerset, PA (US)

(72) Inventor: Daniel Leiss, Somerset, PA (US)

(73) Assignee: JENNY PRODUCTS, INCORPORATED, Somerset, PA (US)

(*) Notice: Subject to any disclaimer, the term of this patent is extended or adjusted under 35 U.S.C. 154(b) by 122 days.

(21) Appl. No.: 14/224,204

(22) Filed: Mar. 25, 2014

(65) Prior Publication Data

US 2015/0273374 A1  Oct. 1, 2015

(51) Int. Cl.

| | | |
|---|---|---|
| B01D 45/12 | (2006.01) | |
| B01D 45/16 | (2006.01) | |
| B01D 45/08 | (2006.01) | |
| A47L 9/16 | (2006.01) | |
| A47L 5/28 | (2006.01) | |
| B01D 45/06 | (2006.01) | |
| B01D 17/02 | (2006.01) | |

(52) U.S. Cl.
CPC . *B01D 45/16* (2013.01); *A47L 5/28* (2013.01); *A47L 9/165* (2013.01); *A47L 9/1633* (2013.01); *A47L 9/1683* (2013.01); *B01D 45/06* (2013.01); *B01D 45/08* (2013.01); *B01D 45/12* (2013.01); *B01D 17/0205* (2013.01)

(58) Field of Classification Search
CPC ......... A47L 9/1633; A47L 5/28; A47L 9/165; A47L 9/1683; B01D 45/12; B01D 45/16; B01D 45/08; B01D 45/06; B01D 17/0205
See application file for complete search history.

(56) References Cited

U.S. PATENT DOCUMENTS

| | | | | |
|---|---|---|---|---|
| 1,773,073 | A * | 8/1930 | Beach | 55/441 |
| 1,897,195 | A * | 2/1933 | Howden | 209/723 |
| 3,885,933 | A * | 5/1975 | Putney | 55/397 |
| 4,778,494 | A * | 10/1988 | Patterson | 96/183 |
| 4,887,936 | A * | 12/1989 | Christianson et al. | 406/171 |
| 5,026,407 | A * | 6/1991 | Tobey | 55/337 |
| 6,502,278 | B2 * | 1/2003 | Oh et al. | 15/353 |
| 6,533,844 | B1 * | 3/2003 | Hiltunen et al. | 95/271 |
| 6,546,593 | B2 * | 4/2003 | Oh et al. | 15/353 |
| 6,821,322 | B2 | 11/2004 | Milia | |
| 7,144,503 | B2 * | 12/2006 | Oserod | 210/221.2 |
| 7,435,290 | B2 | 10/2008 | Lane et al. | |
| 7,662,201 | B2 * | 2/2010 | Lee | 55/419 |
| 7,806,950 | B2 * | 10/2010 | Han et al. | 55/345 |
| 2010/0083832 | A1 | 4/2010 | Pondelick et al. | |

* cited by examiner

*Primary Examiner* — Dung H Bui
(74) *Attorney, Agent, or Firm* — Carothers and Carothers

(57) ABSTRACT

A centrifugal separator wherein in the gas/liquid to be separated is centrifugally flowed consecutively through multiple adjacent concentric cyclonic chambers and thereby forcing the mixture to also flow up and down through respective chambers causing deceleration along with centrifugal separation for maximum efficient separation of the liquid from the gas.

1 Claim, 2 Drawing Sheets

CENTRIFUGAL SEPARATOR AND METHOD OF SEPARATING LIQUIDS FROM GAS

BACKGROUND OF THE INVENTION

The present invention relates to a centrifugal gas/liquid separator and particularly, but not exclusively, to an air/oil separator. Commercial air compressors and gas turbine engines require air/oil separators for recovering oil used to lubricate and cool the bearings and other parts. During lubrication air under pressure is entrained in the oil flow thus forming an air/oil mixture.

It is desirable to utilize an air/oil separator in order to separate the air/oil mixture for returning the oil from the mixture to the tank or sump for reuse. This places less demand and replacement requirement on the oil filters in the system.

It is an object of the present invention to provide a centrifugal separator for separating liquids from gas which has no moving parts, is economical to manufacture, is efficient in operation and requires no inclusion of filter media.

SUMMARY OF THE INVENTION

The centrifugal separator of the present invention includes an annular housing having an outer wall with an inner surface, a closed top and a tangential fluid inlet adjacent the top wherein the inlet is adapted to direct an inlet stream of fluid (air/liquid mixture) under pressure against the inner surface thereby creating centrifugal circulation of the fluid. A fluid outlet pipe axially penetrates the top of the housing and this outlet pipe extends axially downward into the housing to a predetermined depth.

At least two concentric inner an outer annular baffle walls are coaxially disposed in the housing between the outlet pipe and the inner surface of the housing. These walls are sealed to and depend downwardly from the top of the housing. Fluid transfer ports are provided in the inner baffle wall adjacent to the top and the bottom of the outer baffle wall is open to the interior of the housing and the bottom of the inner baffle wall is sealed off at a position below the bottom of the outlet pipe.

This configuration causes the gas/liquid mixture injected under pressure to flow into the inlet of the housing whereby the mixture centrifugally flows about the inner surface of a first outer vertical circular chamber. The mixture thereafter is then directed to flow from the first chamber upwardly into the bottom of a concentric second inner baffle chamber. Thereafter the mixture is directed to flow from the second chamber into the top of a third inner concentric circular baffle chamber, and from the third chamber the flow mixture is directed upwardly into the bottom of the concentric inner exhaust outlet pipe. Liquid expelled from the bottom of the these chambers is collected in a reservoir or sump at the bottom of the housing to be drawn off and reused.

As previously mentioned, the inner baffle wall is sealed off at a bottom position below the bottom of the outlet pipe in order to prevent direct communication between the first outer chamber and the bottom of the third inner chamber and the exhaust outlet pipe. This seal is preferably accomplished with the separated liquid collected at the bottom of the housing and forces the mixture to sequentially flow up and down through all chambers.

The configuration of the gas/liquid separator of the present invention causes the mixture to not only centrifugally flow in stages within the housing, but additionally requires the mixture to flow up and down sequentially within the circular baffle chambers thereby centrifugally separating liquid from the gas, and additionally improving separation due to the fact that the velocity of the mixture is slowed down by being sequentially directed up and down through sequential separation stages. Thus the centrifugal flow combined with the deceleration caused by redirecting the mixture up and down in sequence through the separator results in efficient separation of the liquid from the gas due to the different specific weights.

BRIEF DESCRIPTION OF THE DRAWINGS

Other objects and advantages appear hereinafter in the following description and claims. The accompanying drawings show, for the purpose of exemplification, without limiting the scope of the present invention or the appended claims, certain practical embodiments of the present invention wherein:

DETAILED DESCRIPTION OF A PREFERRED EMBODIMENT

Figure 1:
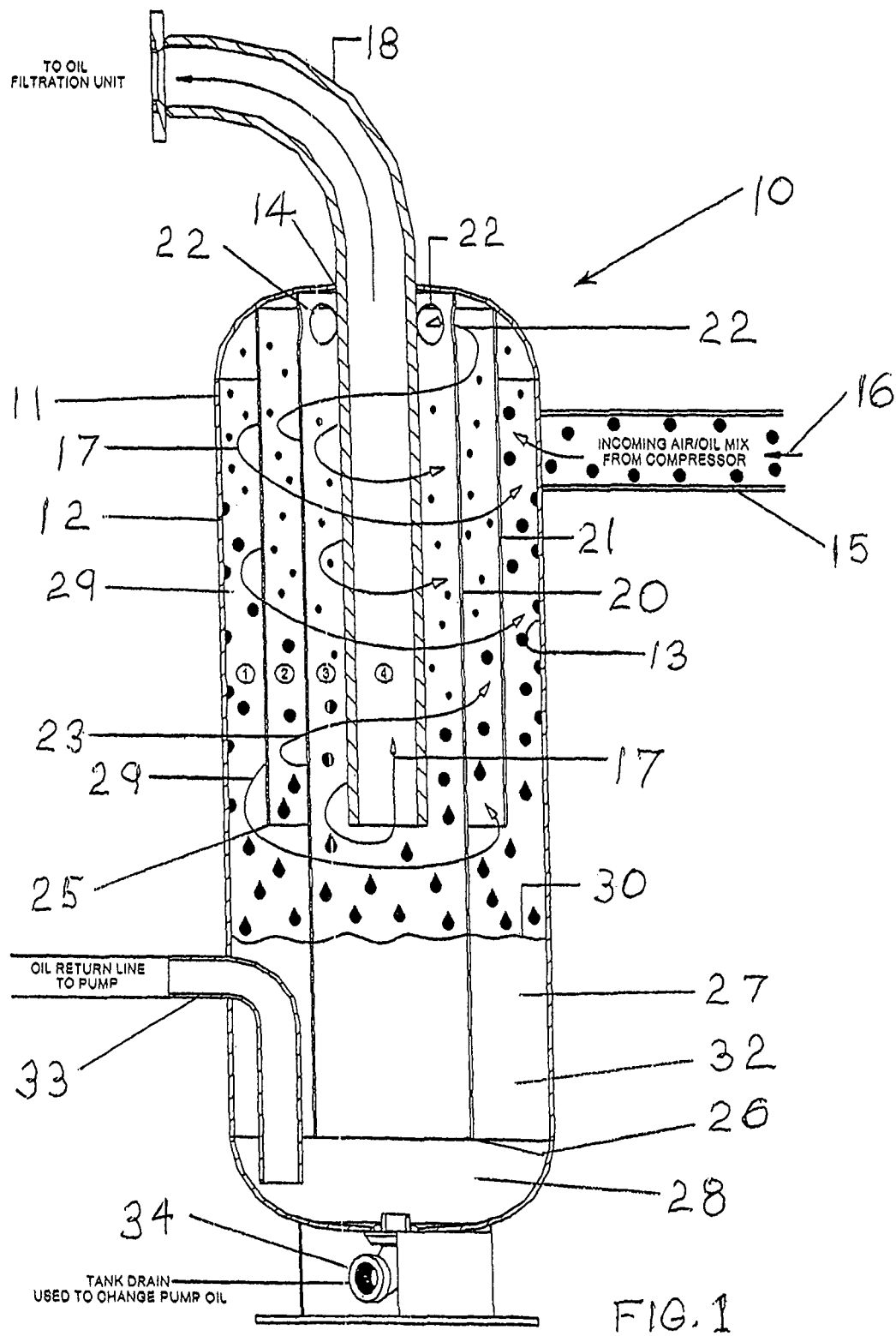
FIG. 1 is a schematic illustration in mid vertical cross section of the gas/liquid separator of the present invention illustrating the centrifugal flow of the air/liquid mixture as it circulates throughout the baffle system of the separator.

Referring to the figures, the centrifugal separator 10 of the present invention is comprised of an annular or circular housing 11 having an outer wall 12 with an inner surface 13 and a closed top 14. A tangential fluid inlet 15 is provided adjacent top 14. Inlet 15 is adapted to direct an inlet stream of an air/liquid mixture indicated by arrow 16, which is under pressure, against inner surface 13 for thereby creating centrifugal circulation of fluid 16 as indicated by internal arrows 17 in FIG. 1.

A fluid outlet pipe 18 axially penetrates top 14 of housing 11 and extends downwardly into housing 11 to a predetermined depth or length 19.

An inner centrifugal baffle system is provided by two concentric inner and outer annular baffle walls, 20 and 21 respectively, which are coaxially disposed in housing 11 between outlet pipe 18 and inner surface 13 of housing 11. Walls 20 and 21 are sealed to and depend downwardly from top 14. Fluid transfer ports 22 are provided in inner baffle wall 20 adjacent top 14 for transferring fluid from chamber 23 into chamber 24.

The bottom 25 of outer baffle wall 21 is open to the interior of housing 11 for free circulation between chamber 29 and chamber 23. The bottom 26 of inner baffle wall 20 is sealed off at bottom position 30 below the bottom 31 of outlet pipe 18 by means of the separated liquid 32, which might typically be oil separated from the air/gas mixture, which is retained in the reservoir 27 of sump 28.

Oil 32 in sump 28 is returned to the lubricating pump for the air compressor or other equipment via return line 33. When desired or required the sump 28 may be drained through drain pipe 34 in order to change pump oil.

Figure 2:
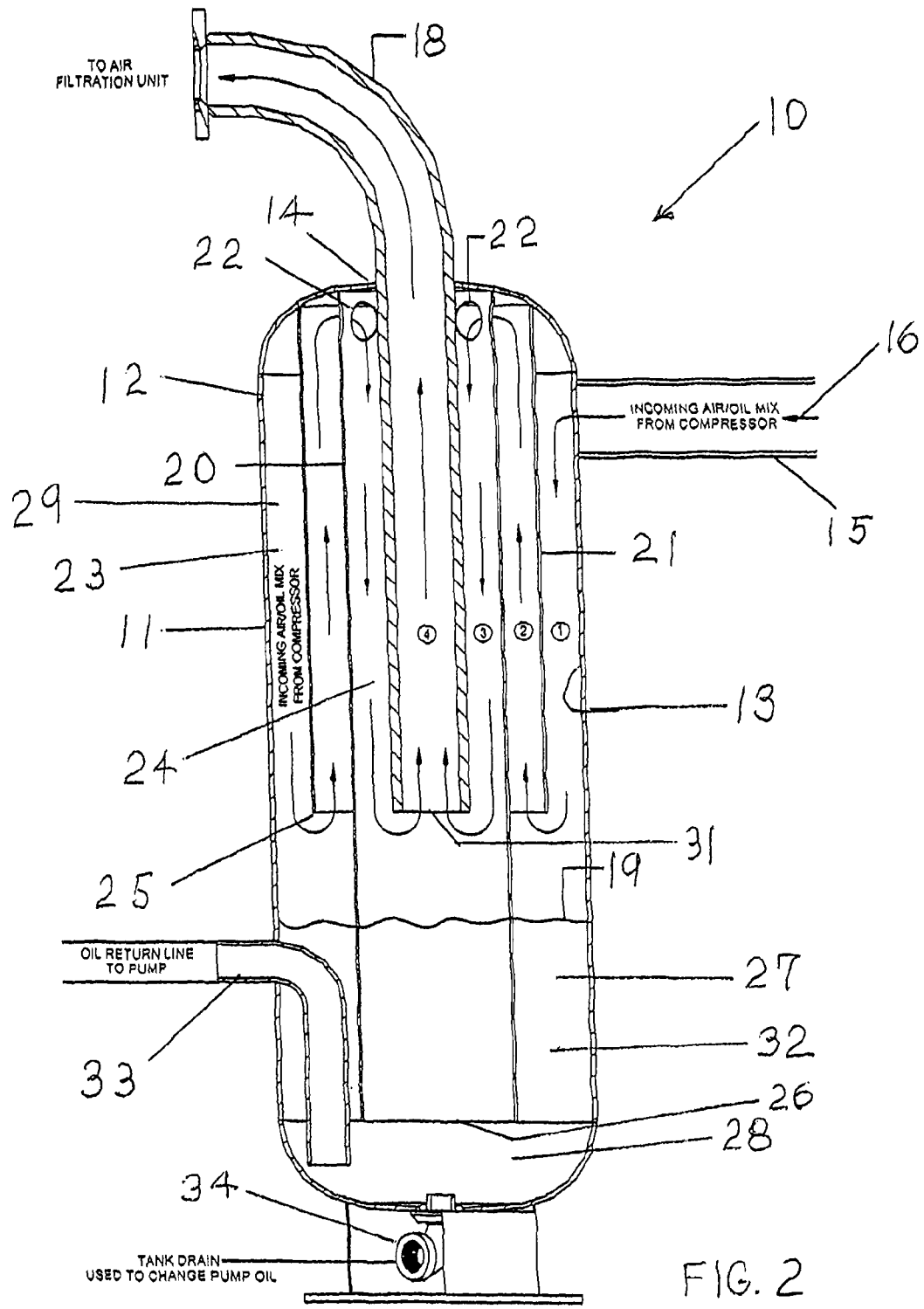
FIG. 2 is a schematic drawing in mid vertical cross section of the separator illustrated in FIG. 1 primarily illustrating the change in direction which the mixture is required to follow when circulating through the baffle system of the separator of the present invention.

Accordingly, the liquid 32 is separated from the gas/liquid mixture 16 by centrifugally flowing the mixture about the inner surface 13 of the first outer vertical circular chamber 29, and is then directed to flow from first chamber 29 upwardly into the bottom 25 of second inner baffle chamber 23. This is made apparent by the arrows indicating movement of the stream as is shown in FIG. 2.

Then the centrifugally flowing mixture is directed from second chamber 23 into the top of third inner concentric circular baffle chamber 24 through ports 22. Thereafter the circulating mixture is directed to flow from third chamber 24 upwardly into the bottom 31 of concentric inner exhaust outlet pipe 18.

This centrifugal circulation of the gas/liquid mixture consecutively within the respective chambers, in combination with the deceleration of the mixture caused by the fact that the fluid flow is forced to change direction downwardly and upwardly through the respective chambers, causes the liquid to precipitate against the respective baffle walls and to flow downwardly into sump 28.

Four chambers 29, 23, 24 and the interior of exhaust pipe 18 are illustrated. However the number of chambers may be increased, but will always be multiples of two in order to provide the appropriate up and down movement of the mixture flow.

The mixed air/liquid flow usually will be a liquid in a gas mixture, such as oil and air, but could be any two fluids that have different specific weights. The greater the difference the respective specific weights, the better the system will function.

The result is that a major portion of the liquid is separated from the gas/liquid mixture thereby alleviating the burden based upon downstream filter elements. In addition, the separator 10 of the present invention is economical to manufacture, has no moving parts and requires no internal filter elements.

I claim:

1. A centrifugal separator for separating liquids from gas comprising:
   an annular housing having an outer wall with an inner surface, a closed top and a tangential fluid inlet adjacent said top, said inlet adapted to direct an inlet stream of an air/liquid mixture under pressure against said inner surface for thereby creating centrifugal circulation of said fluid, and a fluid outlet pipe axially penetrating said top, said outlet pipe extending axially downward into said housing to a predetermined length, the bottom interior of said housing providing a liquid collection sump;
   at least two concentric inner and outer annular baffle walls coaxially disposed in said housing between said outlet pipe and said inner surface, said walls depending downwardly from said top;
   fluid transfer ports in said inner baffle wall adjacent said top;
   the bottom of said outer baffle wall open to the interior of said housing above said sump and the bottom of said inner baffle wall open to the interior of said housing with the bottom thereof open to said liquid collection sump in said housing whereby it is sealed off at a position below the bottom of said outlet pipe and said outer baffle wall with separated liquid collected at the bottom of said housing in said sump thereby providing inner and outer chambers on inner and outer sides of said inner baffle wall which are sealed off from each other by said liquid collected in said sump.

* * * * *